United States Patent [19]

Lehmann et al.

[11] Patent Number: 5,374,943
[45] Date of Patent: * Dec. 20, 1994

[54] METHOD FOR ACTIVATING AND FOR DRIVING PRINTING ELEMENTS

[75] Inventors: Manfred Lehmann, Puchheim; Stefan Scherdel, München, both of Germany

[73] Assignee: Mannesmann Aktiengesellschaft, Düsseldorf, Germany

[*] Notice: The portion of the term of this patent subsequent to Sep. 7, 2010 has been disclaimed.

[21] Appl. No.: 843,603

[22] Filed: Feb. 4, 1992

[30] Foreign Application Priority Data

Aug. 4, 1989 [DE] Germany ............................. 3925913

[51] Int. Cl.$^5$ ..................... B41J 29/38; B41J 2/22; G01D 9/00; G06K 9/44
[52] U.S. Cl. ......................... 347/9; 400/124.28; 395/108; 395/110; 382/55
[58] Field of Search ............. 346/140 R, 1.1; 400/121, 124; 395/108, 109, 110, 114; 382/54–56

[56] References Cited

U.S. PATENT DOCUMENTS

| | | | |
|---|---|---|---|
| 5,062,724 | 11/1991 | Iizuka | 400/121 |
| 5,149,212 | 9/1992 | Murakami | 400/121 |
| 5,155,503 | 10/1992 | Tasaki et al. | 346/140 R |
| 5,171,093 | 12/1992 | Iwamoto et al. | 400/121 |
| 5,207,517 | 5/1993 | Ito | 400/121 |
| 5,216,753 | 6/1993 | Ng | 395/109 |
| 5,237,344 | 8/1993 | Tasaki et al. | 346/140 R |
| 5,242,231 | 9/1993 | Lehmann et al. | 400/121 X |

FOREIGN PATENT DOCUMENTS

| | | |
|---|---|---|
| 0013296 | 7/1980 | European Pat. Off. . |
| 0160318 | 6/1985 | European Pat. Off. . |
| 62-212164 | 9/1987 | Japan . |

OTHER PUBLICATIONS

IBM Technical Disclosure Bulletin, vol. 27, No. 4B, p. 2504 Kitamura: "Draft Font Generation".

Primary Examiner—Benjamin R. Fuller
Assistant Examiner—Eric Frahm
Attorney, Agent, or Firm—Horst M. Kasper

[57] ABSTRACT

A method for driving printing elements of a dot matrix printer provides that the matrix dots to be printed are to be thinned out without any thin lines, in particular steeply inclined thin lines, being lost. To this end, the columns of the matrix are considered to be arranged next to each other in pairs, and before the matrix dots in each line (Z) of the matrix are thinned out, a matrix dot is placed before or after a matrix dot used initially to create the character, so that both matrix dots belonging to a pair of columns (SP1, SP5) are covered by a line (Z). During the subsequent thinning out, the lines are printed sufficiently well and clearly. The process is intended for use in dot matrix printers.

11 Claims, 2 Drawing Sheets

FIG 3

METHOD FOR ACTIVATING AND FOR DRIVING PRINTING ELEMENTS

CROSS-REFERENCE TO RELATED APPLICATIONS

This application is a continuation-in-part application of another international application filed under the Patent Cooperation Treaty Feb. 16, 1990 bearing Application No. PCT/DE90/00106, and listing the United States as a designated and/or elected country. The entire disclosure of this latter application, including the drawings thereof, is hereby incorporated in this application as if fully set forth herein.

BACKGROUND OF THE INVENTION

1. Field of the Invention

The present invention relates to a method for activating and driving printing elements, which printing elements are formed as ink jet print devices, ejecting ink droplets. The ink jet print devices are disposed in several rows with in each case a plurality of printing elements. The ink jet print devices generate dots for the representation of a character at certain grid points within a grid formed in a matrix shape. The generation of the dots within the matrix is performed column by column parallel to each other. A thinning out of the required grid points is performed for the representation of certain characters and character groups, wherein each second printable grid point is suppressed in each column of the grid, and wherein the suppressed matrix dots in the respectively neighboring column are shifted relative to each other by a matrix dot.

2. Brief Description of the Background of the Invention Including Prior Art

Print devices recited above are furnished, for example, in ink jet print devices (DE-OS 1,941,680), wherein many printing elements print characters at high printing speed onto a recording substrate. These printing elements are formed, for example, as ink jet printing elements and are disposed in columns and rows such that they form a matrix. If a character is to be printed, then the printing elements, required for the formation of this character, are driven and activated such that the corresponding matrix dots are inked in the matrix, forming the base for the character formation.

In case of certain character representations (for example, near-letter quality or in case of larger character areas for the reduction of the ink volume), a so-called matrix thinning out is desired. For example, each second printable dot within the matrix is suppressed checkerboard-like in each column. The suppressed dot is shifted by one line in each subsequent column. It can occur in this context that thin lines appear frayed or are also lost depending on the inclination angle.

The first point, present for the formation of the character, was always printed in the near-letter-quality method in each column of the matrix and the matrix thinning out was only subsequently performed according to the checkerboard system in order not to lose any information. However, an interfering structuring of face-like representations can occur in this connection when the starting line is at an inclined or a curved angle.

A method for the adjustment of a serial recording device was submitted as a patent application by the assignee of the instant application on May 14, 1991 and received Ser. No. 07/699,932. A method for printing magnetically recognizable characters using a matrix print head as well as a method for producing the same was submitted as a patent application by the assignee of the instant application on Oct. 21, 1991 and received Ser. No. 07/779,954.

SUMMARY OF THE INVENTION

1. Purposes of the Invention

The purpose of the invention method is now to comprise avoiding the recited disadvantage and avoiding a loss of information.

These and other objects and advantages of the present invention will become evident from the description which follows.

2. Brief Description of the Invention

The present invention provides for a method for the activation and driving of printing elements comprising the following steps. A plurality of ink elements is disposed in several rows for providing ink print devices. Dots for the representation of a character are generated with the ink print devices at certain grid points in a grid. The generation of the dots within a matrix is performed in columns, disposed parallel relative to each other. The columns of the grid are considered to be disposed next to each other in defined pairs. An additional matrix dot is placed in the same line before or after a matrix dot initially used to form the character, depending on the position of this matrix dot within the considered pair, in case two matrix dots of such a column pair are not yet occupied, such that both matrix dots belonging to a pair of columns are occupied in a line. The required grid points are thinned out during a representation of certain characters and character groups in that each second printable grid point is suppressed in each column of the grid and in that the suppressed grid points are shifted by one grid point relative to each other in the in each case neighboring column.

Each column together with a predetermined neighboring column can define a pair of columns.

The ink elements can be formed as impact devices acting on an ink ribbon or as nozzles ejecting ink droplets.

The dots can be formed on a light sensitive substrate by irradiation followed by contact with a toner material.

Each one of the several rows can contain one print element.

In a method for the activation and driving of printing elements a number of rows is defined for providing printing action. An ink element is disposed for each row for providing a respective ink print device. Dots are generated for the representation of a character with the ink print devices at certain grid points in a grid. The generation of the dots within a matrix is performed in columns, with each column containing a point of each row. The columns are disposed parallel relative to each other. Pairs of columns are defined such that each column of the grid and a predetermined neighboring column are representing one of the pairs. Each row is determined in each pair of columns. Only one of the two columns is furnished with a grid point to be printed. An additional matrix dot is placed in the second column belonging to said pair into the same row before or after the grid point furnished in only one of the two columns depending on the position of the grid point within the considered pair such that both matrix dots belonging to a pair of columns are occupied in a row. The grid points are thinned out during a representation of certain characters and character groups such that each alternate grid point of each row and each alternate grid point of each column are suppressed.

According to the present invention, the columns of the matrix are always considered to be disposed next to each other in pairs and before the matrix dots of the matrix are thinned out, a matrix dot is in addition placed in the same line before or after a matrix dot initially used to form the character, depending on the position of this matrix dot within the considered pair, in case the two matrix dots of such a column pair are not yet occupied, such that both matrix dots of a line belonging to a pair of columns of a line are occupied and that the recited thinning out is only then performed.

This is associated with the advantage that, based on the checkerboard-like performed thinning out method of the matrix dots to be printed, there does not occur a loss of essential character parts and that, in particular, also character parts, furnished with an inclination angle of 45°, are recorded.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention:

FIG. 3a is a view of a schematic diagram of the character of FIG. 1 supplemented with dots according to the present invention;

FIG. 3b is a view of a schematic diagram of a thinned out character derived from the supplemented character of FIG. 3a.

DESCRIPTION OF INVENTION AND PREFERRED EMBODIMENT

According to the present invention there is provided for a method for the activation and driving of printing elements. The printing elements are formed as ink print devices, ejecting ink droplets. Said ink print devices are disposed in several rows with in each case a plurality of ink elements. The ink print devices generate dots at certain grid points within a grid, formed in matrix shape, for the representation of a character. The generation of the dots within the matrix is performed in columns, disposed parallel relative to each other. A thinning out of the required grid points is performed during the representation of certain characters and character groups, in that each second printable grid point is suppressed in each column of the grid. The suppressed grid points are shifted by one grid point relative to each other in the respective neighboring column. The columns S of the grid are always considered to be disposed next to each other in pairs SP1–SP5. Before the matrix dots of the matrix are thinned out, a matrix dot is in addition placed in the same line Z before or after a matrix dot initially used to form the character, depending on the position of this matrix dot within the considered pair, in case the two matrix dots of such a column pair are not yet occupied, such that both matrix dots belonging to a pair of columns SP1–SP5 are occupied in a line Z and that the recited thinning out is only then performed.

Figure 1:
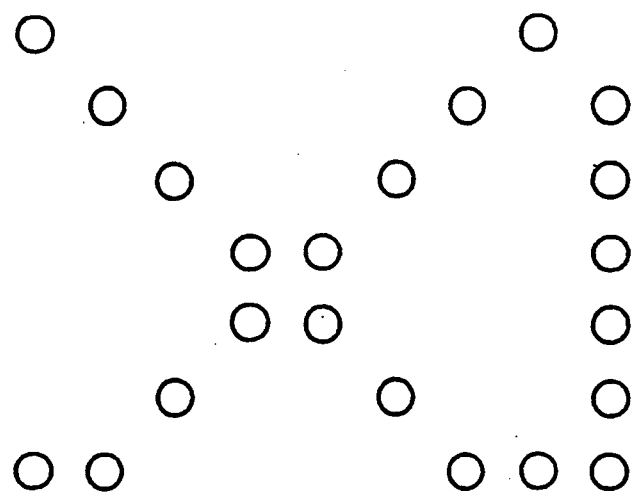
FIG. 1 is a view of a schematic diagram of the diameter in a non-thinned out form.

FIG. 1 illustrates a character, formable of individual matrix dots, in a non-thinned-out shape, with the columns a1, b1 through a5, b5 and the lines 1 through 7, wherein the round circles represent the matrix dots.

Figure 2:
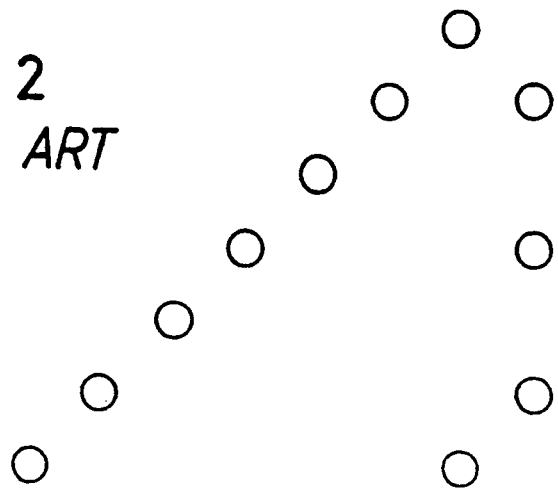
FIG. 2 is a view of a schematic diagram of the character of FIG. 1 in a conventional thinned out form.

FIG. 2 illustrates the same character as in FIG. 1, however thinned out according to the checkerboard-like method with the residual matrix dots shown as circles.

Figure 3:
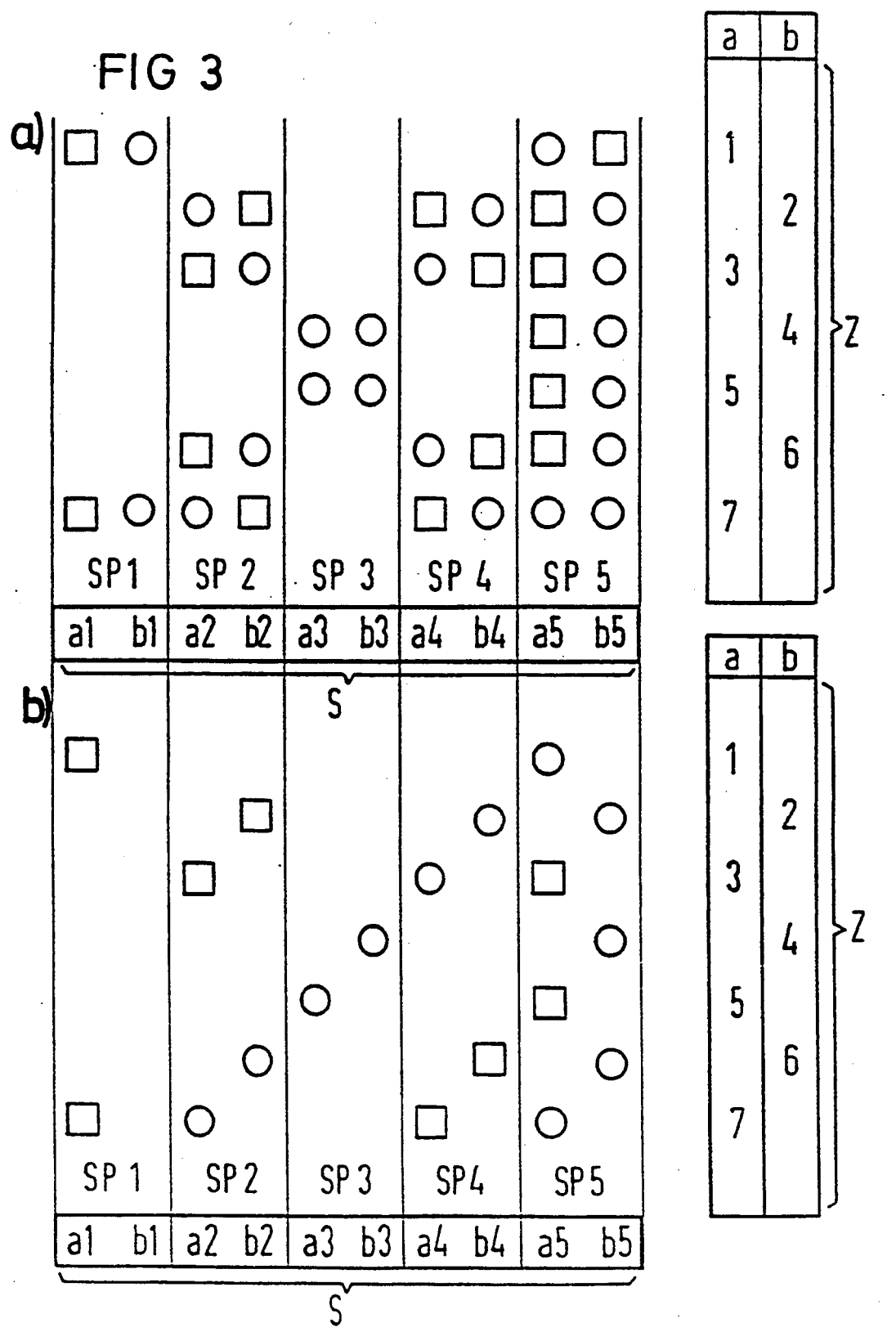

FIG. 3 illustrates again the same character, however, in the figure part a with the additional grid point occupation corresponding to the invention method, in a corresponding control drive unit prior to the thinning out. The additional matrix dots are in this case illustrated in a square form. FIG. part b illustrates the same character after a thinning out corresponding to the known checkerboard-like method. The initial grid points are shown therein as circles and the points, generated by the additional grid points, are recorded with a square shape.

As can be recognized from FIGS. 1 and 2, in particular in certain inclined positions of character parts, so many essential grid points are eliminated under certain circumstances during the formation of a character during a thinning out of the rectangular grid according to the conventional method that the character as such can no longer be unequivocally recognized.

For example, in column b1, no matrix dot is inked in lines 1, 3, 5, and 7. In the columns a2, b3, a3, b3, a4, b4, only one matrix dot is inked in each case such that the character part, running from the left top toward the right bottom, disappears completely (FIG. 2).

According to FIG. 3a, the columns S of the grid are combined next to each other in pairs. There are generated the column pairs SP1 through SP5 in case of a column number of 10. The grid is filled up with grid points (in the storage of a corresponding control drive unit) prior to the desired thinning out of the grid for the formation of the character such that an additional matrix dot is added in a line Z to each matrix dot, provided for the initial formation of the character, if a grid point still remains unoccupied in this line Z within the respective column pair SP1 through SP5. The additional grid point can therefore be placed before or after the initial grid point or can also be dispensed with if both grid points are occupied in a line within a column pair.

The grid point a2 in line 6 of FIG. 3a would be an example for the prior occupation; the grid point b2 in line 7 of the same figure would be an example for the postplacement, and an example for the dispensing with an additional grid point would be the grid points a3/b3 in line 5 or a3/b3 in line 4 (column pair SP3) in the same figure.

The thinning out according to the checkerboard-like method occurs in a conventional way after the addition to and supplementing of the grid points and there results a character formation according to FIG. 3b. The thinning out allows to provide an image employing a grid which is coarser, e.g. twice as coarse, but which nevertheless provides an adequate representation of the item to be printed. Such thinning out allows to reduce the number of dots while substantially avoiding loss of resolution, thereby saving equipment costs and/or printing time. There results a sufficient number of matrix dots well distributed to allow recognition of the character. This method is in particular very simple relative to computing requirements, since always only the determination has to be made if a grid point is missing within one line within one column pair. A possibly uneven reproduction of thin lines can be compensated by a relatively high resolution.

It will be understood that each of the elements described above, or two or more together, may also find a useful application in other types of methods for driving printing elements differing from the types described above.

While the invention has been illustrated and described as embodied in the context of a method for activating and for driving printing elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for an activation and driving of printing elements comprising the steps of:
   disposing a plurality of ink elements in several rows for providing ink print devices;
   generating dots for a representation of a character with the ink print devices at certain grid points in a grid, wherein the generation of the dots within the grid is performed in columns having a plurality of rows, said columns, disposed parallel relative to each other, and wherein the columns of the grid are considered to be disposed next to each other in defined pairs;
   placing an additional grid point in a same row of said pair of columns before or after a grid point initially used to form the character, depending on a position of the initial grid point within a considered pair of said columns in an event that a grid point of each of said pair of columns are not yet occupied by one of said dots such that said additional grid point and said initial grid point of said pair of columns are occupied in a row; thinning out of some of said certain grid points during a representation of certain characters and character groups, wherein one of the additional grid point or the initial grid point is suppressed in each of said columns of the grid, and wherein the suppressed grid point is shifted by one grid point relative to another grid point in a respective neighboring column in the considered pair of grid points.

2. The method for the activation and driving of printing elements according to claim 1, wherein each column together with a predetermined neighboring column defines a pair of columns.

3. The method for the activation and driving of printing elements according to claim 1, wherein the ink elements are formed as impact devices acting on an ink ribbon.

4. The method for the activation and driving of printing elements according to claim 1, wherein the ink elements are formed as nozzles ejecting ink droplets.

5. The method for the activation and driving of printing elements according to claim 1, wherein the dots are formed on a light sensitive substrate by irradiation followed by contact with a toner material.

6. The method for the activation and driving of printing elements according to claim 1, wherein each one of the several rows contains one print element.

7. A method for an activation and driving of printing elements comprising the steps of:
   defining a number of rows for providing printing action;
   disposing an ink element for each row for providing a respective ink print device;
   generating dots for a representation of a character with respective ink print devices at certain grid points in a grid, wherein the generation of the dots within the grid is performed in columns, with each column containing a point of each row, wherein the columns are disposed parallel relative to each other, and wherein pairs of columns are defined such that each column of the grid and a predetermined neighboring column are representing one of the pairs of columns;
   determining each row in each pair of columns, wherein only one of two columns is furnished with a grid point to be printed, and placing an additional grid point in a second column belonging to said pair of columns into a same row before or after a grid point furnished in only one of the two columns depending on a position of the grid point within a considered pair of columns such that both grid points belonging to a pair of columns are occupied in a row;
   thinning out of some of said certain grid points during a representation of certain characters and character groups such that each alternate grid point of each row and each alternate grid point of each column are suppressed.

8. The method for the activation and driving of printing elements according to claim 7, wherein each ink element is formed as an impact device acting on an ink ribbon.

9. The method for the activation and driving of printing elements according to claim 7, wherein ink elements are formed as nozzles ejecting ink droplets.

10. The method for the activation and driving of printing elements according to claim 7, wherein the dots are formed on a light sensitive substrate by irradiation followed by contact with a toner material.

11. A method for an activation and driving of printing elements, comprising the steps of:
   disposing ink print devices, in several rows, wherein the ink print devices include in each case a plurality of ink elements, and wherein the ink elements eject ink droplets;
   generating dots with the ink print devices at certain grid points within a grid, formed in matrix shape, for representation of a character, wherein the generation of the dots within the grid is performed in columns, disposed parallel relative to each other;
   thinning out some of said certain grid points during a representation of certain characters and character groups, in that each second dot generated data grid point is suppressed in each column of the grid, and wherein the suppressed grid point is shifted by one grid point relative to another slice point in a respective neighboring column, and wherein the columns (S) of the grid are always considered to be disposed next to each other in pairs (SP1-SP5);

placing an additional grid point, before the some of said certain grid points of the grid are thinned out, in a same row (Z) before or after a grid point initially used to form the character, depending on a position of the initial grid point within a considered pair of columns, in case two grid points of such a column pair are not yet occupied, such that both said additional grid point and said initial grid point belonging to a pair of columns (SP1-SP5) are occupied in a row (Z) and that the thinning out is only then performed.

* * * * *